United States Patent
Watanabe et al.

(10) Patent No.: US 10,135,371 B2
(45) Date of Patent: Nov. 20, 2018

(54) DOOR OPENING/CLOSING DEVICE AND DOOR OPENING/CLOSING METHOD

(71) Applicant: MITSUI KINZOKU ACT CORPORATION, Kanagawa (JP)

(72) Inventors: Yasuyuki Watanabe, Kanagawa (JP); Ayahito Kojima, Kanagawa (JP)

(73) Assignee: Mitsui Kinzoku Act Corporation, Kanagawa (JP)

(*) Notice: Subject to any disclaimer, the term of this patent is extended or adjusted under 35 U.S.C. 154(b) by 1 day.

(21) Appl. No.: 14/766,967

(22) PCT Filed: Jun. 25, 2014

(86) PCT No.: PCT/JP2014/066872
§ 371 (c)(1),
(2) Date: Aug. 10, 2015

(87) PCT Pub. No.: WO2015/173972
PCT Pub. Date: Nov. 19, 2015

(65) Prior Publication Data
US 2016/0087565 A1    Mar. 24, 2016

(30) Foreign Application Priority Data
May 15, 2014 (JP) .................... 2014-101796

(51) Int. Cl.
*H02P 1/04* (2006.01)
*E05F 15/00* (2015.01)
(Continued)

(52) U.S. Cl.
CPC ............. *H02P 7/29* (2013.01); *B60J 5/04* (2013.01); *B60J 5/06* (2013.01); *B60J 5/10* (2013.01);
(Continued)

(58) Field of Classification Search
CPC ........... E05F 15/127; B64C 13/42; H02P 1/04
(Continued)

(56) References Cited

U.S. PATENT DOCUMENTS 6,407,520 B1* 6/2002 Kleefeldt ............... E05B 77/48
292/201
6,425,206 B1 7/2002 Noda et al.
(Continued)

FOREIGN PATENT DOCUMENTS

JP    2712418 B2    2/1988
JP    11-119838 A   4/1999
(Continued)

OTHER PUBLICATIONS

International Search Report and Written Opinion PCT/JP2014/066872 dated Sep. 16, 2014.
(Continued)

*Primary Examiner* — Jorge L Carrasquillo
*Assistant Examiner* — Cortez Cook
(74) *Attorney, Agent, or Firm* — McDermott, Will & Emery LLP (57) ABSTRACT

A door opening/closing device includes: a motor; and a control unit that is configured to control a rotation rate of the motor by pulse-width modulation (PWM) control. The door opening/closing device opens and closes a door of a vehicle with power of the motor. The control unit is configured to perform the PWM control on the motor at a PWM frequency set so as to deviate from a resonance point of an installation body on which the motor is installed.

4 Claims, 7 Drawing Sheets

(51) Int. Cl.
  *B64C 13/42*    (2006.01)
  *H02P 7/29*     (2016.01)
  *B60J 5/04*     (2006.01)
  *B60J 5/06*     (2006.01)
  *B60J 5/10*     (2006.01)
  *E05F 15/603*   (2015.01)

(52) U.S. Cl.
  CPC ....... *E05F 15/603* (2015.01); *E05Y 2400/334* (2013.01); *E05Y 2900/531* (2013.01)

(58) Field of Classification Search
  USPC .................................. 318/280; 49/138, 340
  See application file for complete search history.

(56) References Cited

U.S. PATENT DOCUMENTS

| | | | |
|---|---|---|---|
| 2004/0256881 A1 | 12/2004 | Takeda et al. | |
| 2006/0137248 A1* | 6/2006 | Ichinose | E05F 15/611 49/340 |
| 2006/0137250 A1 | 6/2006 | Imai et al. | |
| 2007/0194738 A1* | 8/2007 | Hirai | B64C 13/42 318/480 |
| 2010/0052583 A1* | 3/2010 | Takamatsu | B60L 11/18 318/400.09 |
| 2010/0188327 A1* | 7/2010 | Frid | G06F 3/016 345/156 |
| 2011/0262112 A1* | 10/2011 | Tanaka | G01P 3/48 388/811 |

FOREIGN PATENT DOCUMENTS

| | | | |
|---|---|---|---|
| JP | 2005-082019 | A | 3/2005 |
| JP | 2006-304473 | A | 11/2006 |
| JP | 2006304473 | A * | 11/2006 |
| JP | 2008-002089 | A | 1/2008 |
| JP | 2008-005656 | A | 1/2008 |
| JP | 2013-244699 | A | 12/2013 |

OTHER PUBLICATIONS

Office Action issued in corresponding Chinese Patent Application No. 201480022452.8, dated Oct. 10, 2016.

Japanese Office Action issued in corresponding Japanese Patent Application No. 2014-101796, dated Aug. 14, 2018, with English Translation.

* cited by examiner

DOOR OPENING/CLOSING DEVICE AND DOOR OPENING/CLOSING METHOD

CROSS-REFERENCE TO RELATED APPLICATIONS

This application is the U.S. National Phase of PCT/JP2014/066872 filed Jun. 25, 2014, which claims priority to Japanese Patent Application No. 2014-101796 filed May 15, 2014. The subject matter of each is incorporated herein by reference in entirety.

FIELD

The present invention relates to a door opening/closing device and a door opening/closing method.

BACKGROUND

Some hatchback doors, sliding doors, and the like of vehicles can be opened and closed by door opening/closing devices besides by a manual opening and closing operation (refer to Patent Literature 1, for example). Some of the door opening/closing devices assist the manual opening and closing operation, thereby reducing an operator's burden. Such door opening/closing devices cause a control unit to perform pulse-width modulation (PWM) control on the rotation rate of a motor, thereby moving the door in an opening direction or a closing direction.

CITATION LIST

Patent Literature

Patent Literature 1: Japanese Patent Application Laid-open No. 2005-082019

SUMMARY

Technical Problem

When a door is opened and closed by such a door opening/closing device including a motor controlled by pulse-width modulation (PWM) control, a sound louder than expected may possibly be generated.

In view of the problem described above, the present invention aims to provide a door opening/closing device that generates a small sound when opening and closing a door.

Solution to Problem

To solve the above-described problem and achieve the above-described object, a door opening/closing device according to the present invention includes: a motor; and a control unit that is configured to control a rotation rate of the motor by pulse-width modulation (PWM) control, the door opening/closing device opening and closing a door of a vehicle with power of the motor. The control unit is configured to perform the PWM control on the motor at a PWM frequency set so as to deviate from a resonance point of an installation body on which the motor is installed.

In the door opening/closing device according to the present invention, the installation body includes: a housing unit that is configured to house the motor; a fixing unit that is configured to fix the door opening/closing device to the vehicle; and the vehicle.

In the door opening/closing device according to the present invention, the PWM frequency is set higher than a frequency of the resonance point.

A door opening/closing method according to the present invention, for controlling a rotation rate of a motor by pulse-width modulation (PWM) control and opening and closing a door of a vehicle with power of the motor, the door opening/closing method includes: performing the PWM control on the motor at a PWM frequency set so as to deviate from a resonance point of an installation body on which the motor is installed.

In the door opening/closing method according to the present invention, the installation body includes: a housing unit that is configured to house the motor; a fixing unit that is configured to fix a door opening/closing device to the vehicle; and the vehicle.

In the door opening/closing method according to the present invention, the PWM control is performed at the PWM frequency set higher than a frequency of the resonance point.

Advantageous Effects of Invention

The present invention can provide a door opening/closing device that generates a small sound when opening and closing a door by a control unit performing PWM control at a PWM frequency set so as to deviate the resonance point between a motor and an installation body on which the motor is installed.

DESCRIPTION OF EMBODIMENTS

Exemplary embodiments of a door opening/closing device and a door opening/closing method according to the present invention are described below with reference to the accompanying drawings. The embodiments are not intended to limit the invention. In the drawings, like or corresponding components are denoted by like reference numerals as appropriate. The drawings are schematic illustrations, and it is necessary to note that the relation between the sizes of components, the ratio between the components, and other elements may be different from those in an actual configuration. The relation between the sizes and the ratio may also be different among the drawings.

Embodiment

Figure 1:
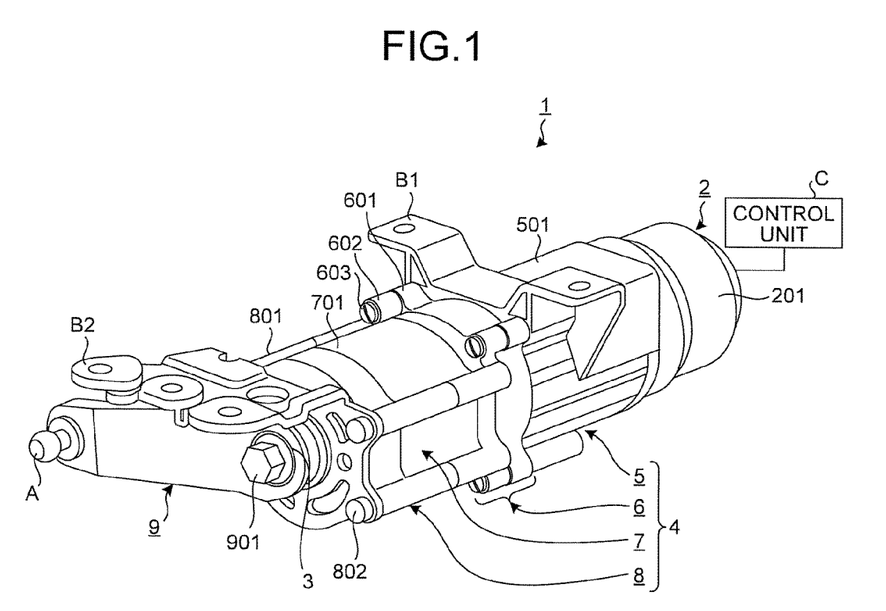
FIG. 1 is a schematic of a configuration of a door opening/closing device according to an embodiment of the present invention.

A door opening/closing device according to an embodiment of the present invention will be described. FIG. 1 is a schematic of a configuration of the door opening/closing device according to the embodiment of the present invention. The door opening/closing device according to the present embodiment electrically opens and closes a hatchback door, a sliding door, and the like of a vehicle or assists an operator's opening and closing operation. As illustrated in FIG. 1, a door opening/closing device 1 includes a motor 2, an output shaft 3, a transmission mechanism 4, and a control unit C. As illustrated in FIG. 1, the transmission mechanism 4 includes a first planetary gear mechanism 5, a sensor mechanism 6, a second planetary gear mechanism 7, and a third planetary gear mechanism 8. The control unit C and the sensor mechanism 6 are supplied with electricity from an on-vehicle power source.

The motor 2 generates power to open and close a door and includes a rotor, an electromagnet, and other components, none of which is illustrated, in a cylindrical motor case 201 serving as a housing unit. The electromagnet is connected to the control unit C and is controlled by the control unit C performing PWM control. The output shaft 3 outputs the power to open and close the door and is connected to a rotating shaft of the motor 2 via the transmission mechanism 4. The output shaft 3 is provided with an arm 9 that transmits the power to be output to open and close the door to the door or the vehicle main body via an opening/closing member. The arm 9 is attached by inserting a bolt 901 into an attachment hole, which is not illustrated, with a spacer interposed therebetween and screwing the bolt 901 into an attachment hole (not illustrated) of the output shaft 3.

The motor case 201 houses the motor 2 and is made of a resin or aluminum, for example.

The transmission mechanism 4 transmits the power of the motor 2 to the output shaft 3. The first planetary gear mechanism 5, the sensor mechanism 6, the second planetary gear mechanism 7, and the third planetary gear mechanism 8 are arranged in this order from the motor 2 in the axis direction of the rotating shaft of the motor 2.

The first planetary gear mechanism 5 is a first deceleration mechanism that decelerates and outputs the power received from the motor 2. Members constituting the deceleration mechanism of the first planetary gear mechanism 5 are housed in a gear case 501 connected to the motor case 201. The gear case 501 has a bracket B1 serving as a fixing unit used to fix the door opening/closing device 1 to the vehicle main body or the door. The power received by the first planetary gear mechanism 5 is decelerated and output to the sensor mechanism 6.

The sensor mechanism 6 detects driving conditions of the door opening/closing device 1. The sensor mechanism 6 includes a magnet shaft, a magnet ring, and a giant magneto resistance effect (GMR) sensor, none of which is illustrated, housed in sensor cases 601 and 602 fixed to the motor case 201 with bolts 603.

The magnet shaft is fitted into and fixed to the magnet ring. The magnet ring is a plate ring member and is magnetized such that the S pole and the N pole are alternately arranged along the circumference. The GMR sensor is fixed to the sensor case 602.

The magnet shaft is rotated by the power received from the first planetary gear mechanism 5. When the magnet shaft is rotated, the magnet shaft and the magnet ring are integrally rotated. When the magnet ring is rotated, the GMR sensor detects magnetic flux density received from the magnet ring and generates a pulse signal. Detecting the pulse signal generated in this manner with a pulse sensor allows the driving conditions of the door opening/closing device 1, particularly the rotation speed and the rotation direction, to be detected. The power received by the sensor mechanism 6 is output from the magnet shaft to the second planetary gear mechanism 7.

The second planetary gear mechanism 7 and the third planetary gear mechanism 8 constituted as a two-stage planetary gear mechanism serves as a second deceleration mechanism that decelerates and outputs the power received from the first planetary gear mechanism 5 via the sensor mechanism 6. Members constituting the deceleration mechanism of the two-stage planetary gear mechanism are housed in gear cases 701 and 801. The power received by the second planetary gear mechanism 7 is decelerated and output to the output shaft 3.

The gear cases 701 and 801 are fixed to the sensor case 602 with bolts 802 with a bracket B2 arranged thereon. The bracket B2 serves as a fixing unit used to fix the door opening/closing device 1 to the vehicle main body or the door.

Figure 2A:
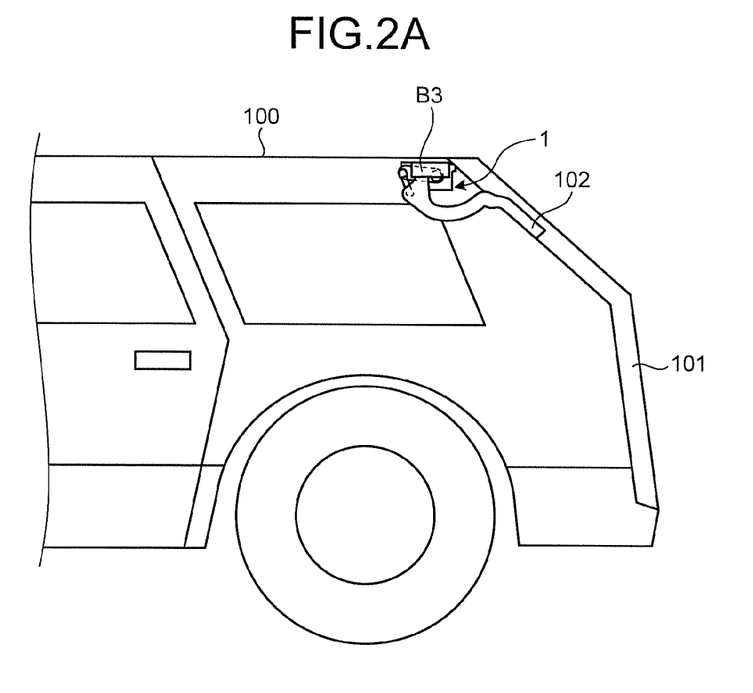
FIG. 2A is a schematic of an installation example where the door opening/closing device according to the present embodiment is used to open and close a hatchback door.
Figure 2B:
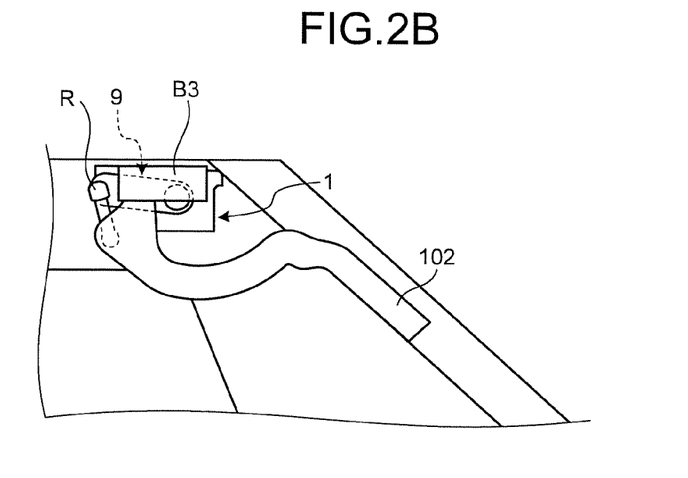
FIG. 2B is a schematic of the installation example where the door opening/closing device according to the present embodiment is used to open and close the hatchback door.
Figure 3A:
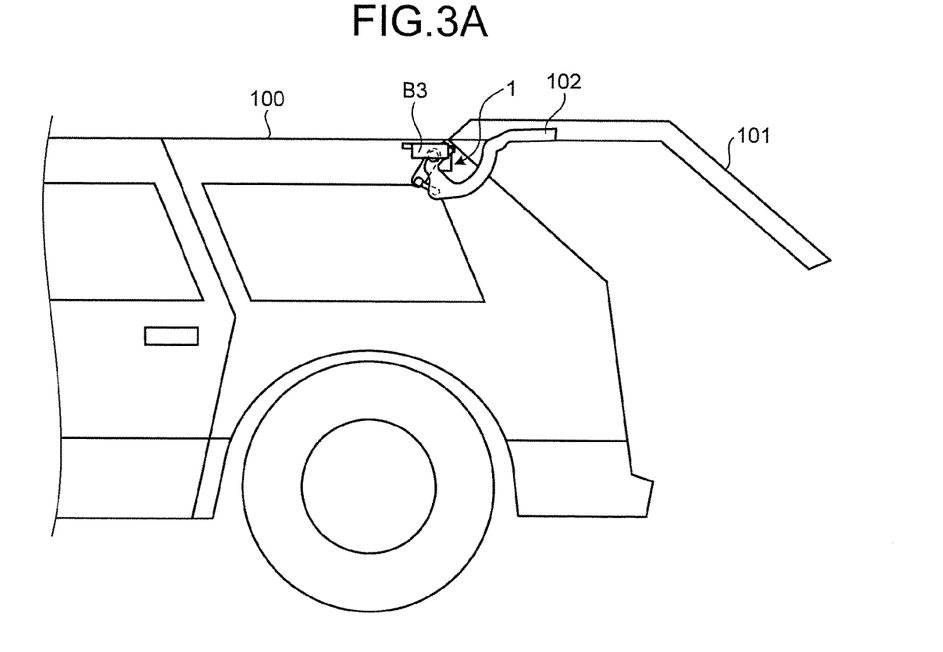
FIG. 3A is a schematic of the installation example where the door opening/closing device according to the present embodiment is used to open and close the hatchback door.
Figure 3B:
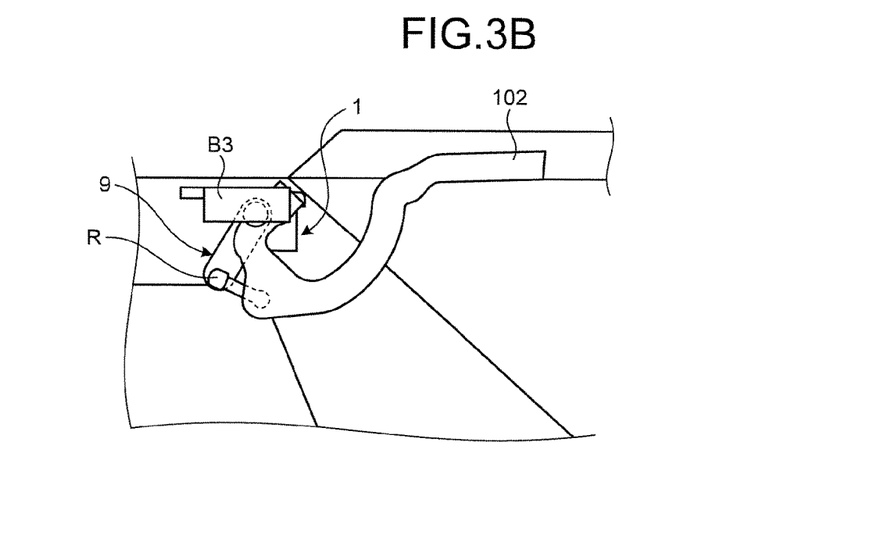
FIG. 3B is a schematic of the installation example where the door opening/closing device according to the present embodiment is used to open and close the hatchback door.

The following describes an installation example of the door opening/closing device 1 according to the present embodiment. FIGS. 2A, 2B, 3A, and 3B are schematics of an installation example where the door opening/closing device according to the present embodiment is used to open and close a hatchback door. FIGS. 2A and 2B illustrate a state where the hatchback door is closed, whereas FIGS. 3A and 3B illustrate a state where the hatchback door is opened. FIGS. 2A and 3A are general views of a rear part of a vehicle, whereas FIGS. 2B and 3B are partial enlarged views of FIGS. 2A and 3A, respectively. As illustrated in FIGS. 2A and 3A, the door opening/closing device 1 according to the present embodiment is fixed to a ceiling of a vehicle 100 with the brackets B1 and B2 serving as the fixing units in a manner arranged horizontally in the width direction of the vehicle 100. As illustrated in FIGS. 2B and 3B, an end of a rod R serving as an opening/closing member is connected to the arm 9 connected to the door opening/closing device 1. The other end of the rod R is connected to a hinge 102 serving as an opening/closing member. An end of the hinge 102 is fixed to the ceiling of the vehicle 100 with a bracket B3, whereas the other end of the hinge 102 is fixed to a hatchback door 101.

When the control unit C is supplied with electricity from the on-vehicle power source and inputs a pulse current at a certain frequency (PWM frequency) and a certain duty ratio to the motor 2, the motor 2 drives to rotate at a rotation rate corresponding to the duty ratio. As the duty ratio of the pulse current increases, the rotation rate of the motor 2 increases; whereas, as the duty ratio decreases, the rotation rate of the motor 2 decreases. Thus, the motor 2 is controlled by PWM control. The driving motor 2 transmits power to the output shaft 3 via the transmission mechanism 4, thereby rotating the output shaft 3. When the output shaft 3 is rotated, the arm 9 is rotated about the output shaft 3 as illustrated in FIGS. 2B and 3B. Thus, the rod R and the hinge 102 are rotated in an interlocking manner, thereby opening and closing the hatchback door 101. The rotation direction of the motor 2 is switched depending on whether to open or close the hatchback door 101. The rotation direction of the motor 2 is switched by switching of the direction of flow of the pulse current.

Figure 4:
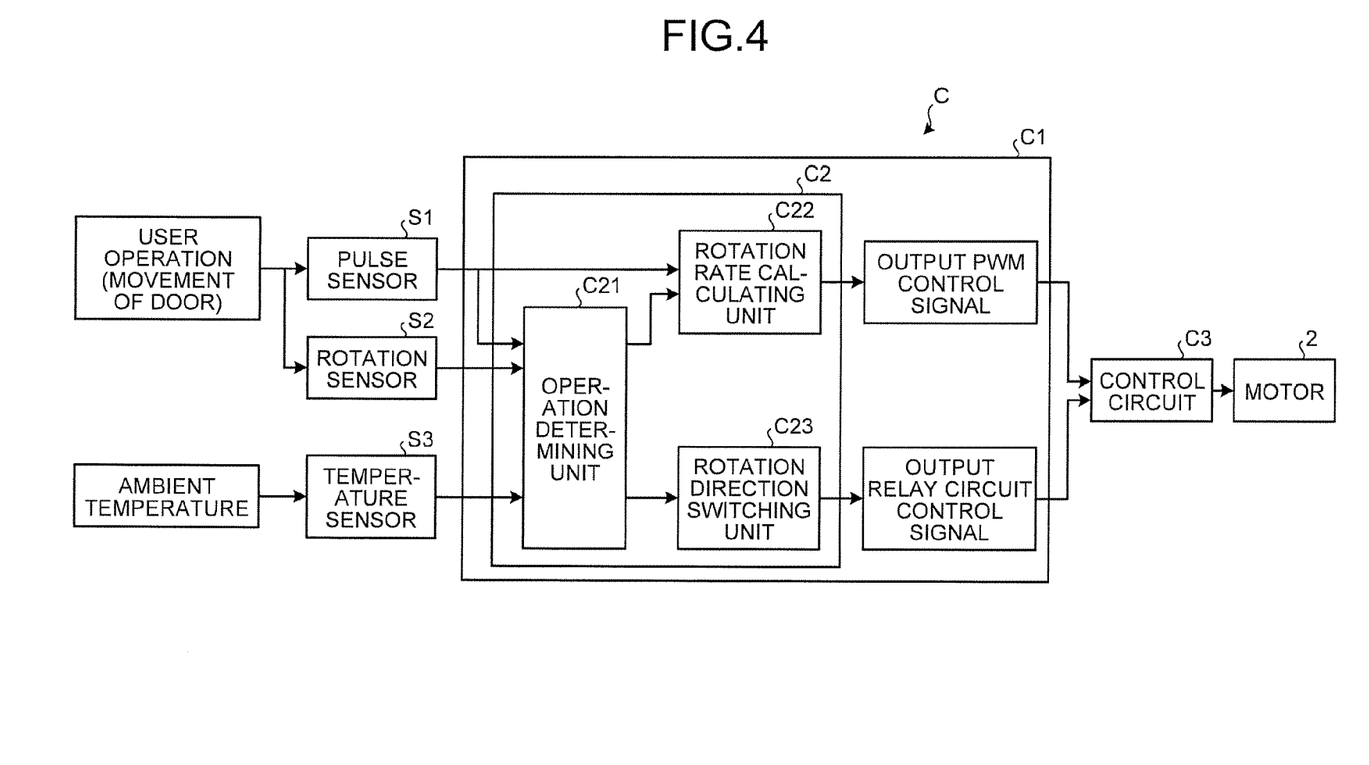
FIG. 4 is a block diagram illustrating an operation of a control unit according to the present embodiment.

The following describes the PWM control performed on the motor 2 by the control unit C in a case where the door opening/closing device 1 assists manual opening and closing of the door. FIG. 4 is a block diagram illustrating an operation of the control unit according to the present embodiment. As illustrated in FIG. 4, the control unit C includes an electronic control unit (ECU) C1, a micro processing unit (MPU) C2 serving as a part of the ECU C1, and a control circuit C3 that performs PWM control on the motor 2 in response to a control signal received from the ECU C1. The MPU C2 includes an operation determining unit C21, a rotation rate calculating unit C22, and a rotation direction switching unit C23. The control circuit C3 includes a switching element and a relay circuit. The switching element performs PWM control on the motor 2. The relay circuit switches the direction of the pulse current flow, thereby switching the rotation direction of the motor 2. The ECU C1 receives electrical signals from a pulse sensor S1 connected to the sensor mechanism 6, a rotation sensor S2 serving as an angular velocity sensor attached to the hatchback door 101, and a temperature sensor S3.

When a user operation is performed to open or close the hatchback door 101 and the position of the hatchback door 101 is moved, the power is transmitted via the hinge 102, the rod R, and the arm 9, thereby rotating the output shaft 3. Rotating the output shaft 3 transmits the power by the mechanisms in the door opening/closing device 1, thereby rotating the magnet ring of the sensor mechanism 6. When the magnet ring is rotated, the GMR sensor detects magnetic flux density received from the magnet ring and generates a pulse signal. The pulse sensor S1 detects the generated pulse signal and outputs an electrical signal corresponding to the detected pulse signal.

When the user operation is performed and the position of the hatchback door 101 is moved, the rotation sensor S2 attached to the hatchback door 101 detects the position of the door, the movement speed, and the movement direction. The rotation sensor S2 outputs an electrical signal corresponding to each piece of detected information.

The temperature sensor S3 outputs an electrical signal corresponding to ambient temperature outside the vehicle 100.

The electrical signals output from the respective sensors are received by the operation determining unit C21 of the MPU C2. The operation determining unit C21 determines at how much rotation speed the motor 2 is to be rotated and whether the motor 2 is rotated in the opening direction or the closing direction. The operation determining unit C21 may detect the ambient temperature outside the vehicle 100 from the electrical signal received from the temperature sensor S3, thereby determining the rotation speed based on the ambient temperature.

Subsequently, the operation determining unit C21 inputs the determination result to the rotation rate calculating unit C22 and the rotation direction switching unit C23. To operate the hatchback door 101 at a certain movement speed, the rotation rate calculating unit C22 calculates the rotation rate of the motor 2 required to achieve the certain movement speed of the hatchback door 101. The rotation rate calculating unit C22 calculates the rotation rate based on the present driving conditions (the rotation speed and the rotation direction) of the door opening/closing device 1 received from the pulse sensor S1 and on the determination result received from the operation determining unit C21. The rotation rate calculating unit C22 also calculates the duty ratio in the PWM control to achieve the rotation rate. The PWM frequency is set to a certain value, which will be described later, and information on the value is stored in a storage unit of the rotation rate calculating unit C22, for example. The ECU C1 outputs the duty ratio calculated by the rotation rate calculating unit C22 and the set PWM frequency to the control circuit C3 as a PWM control signal.

The rotation direction switching unit C23 outputs a relay circuit control signal to rotate the motor 2 in a certain direction based on the determination result received from the operation determining unit C21.

Based on the received PWM control signal and the received relay circuit control signal, the control circuit C3 supplies a pulse current flowing in a certain direction at the certain duty ratio and the certain frequency to the motor 2. As a result, the motor 2 is driven, thereby carrying out a desired opening and closing operation of the door.

In a case where the motor 2 is controlled by the PWM control, an installation body on which the motor 2 is installed may possibly resonate, thereby making a sound generated when the door opening/closing device 1 performs an opening and closing operation louder than expected. The installation body includes the motor case 201 serving as a housing unit, the brackets B1 and B2 serving as fixing units, and the vehicle 100, and each or all of the components may possibly resonate. Resonance occurs in a case where the PWM frequency in the PWM control performed on the motor 2 is close to a natural frequency determined by the rigidity and the mass of the installation body. The natural frequency, for example, is expressed by the following equation:

$$\text{(Natural Frequency)}=\text{(Coefficient Determined by Support Condition and the Like of Motor 2 to Installation Body)} \times \sqrt{\text{(Rigidity/MASS)}}$$

In the door opening/closing device 1 according to the present embodiment, the control unit C performs the PWM control on the motor 2 at a PWM frequency set so as to deviate from the resonance point of the installation body on which the motor 2 is installed. Thus, it is possible to make the sound generated in the opening and closing operation of the hatchback door 101 smaller.

Figure 5:
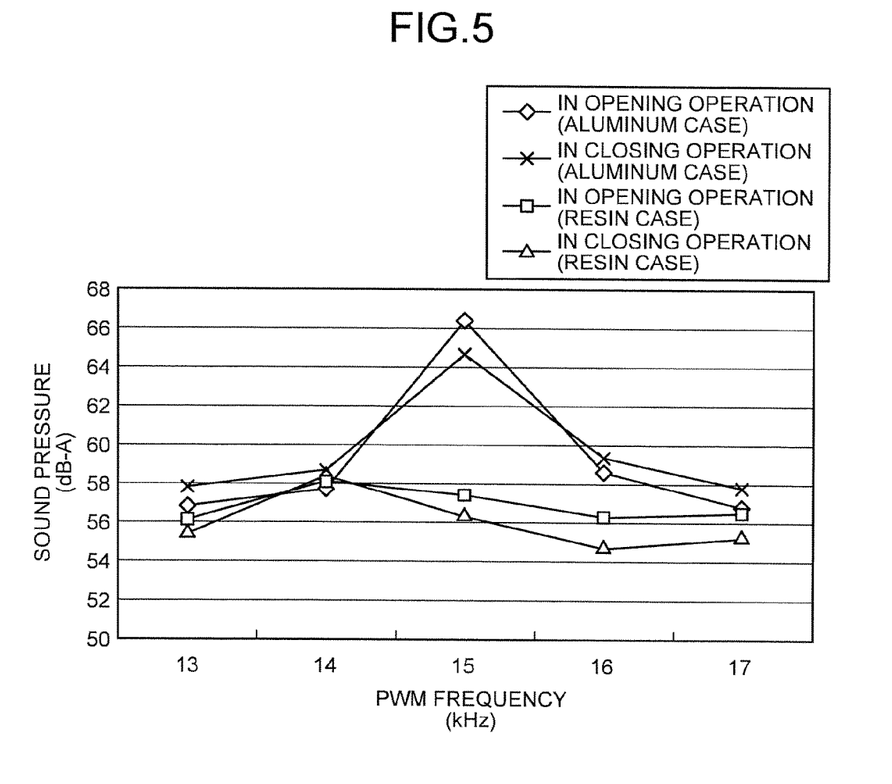
FIG. 5 is a diagram of results of measurement of sound pressure in a case where the door opening/closing device according to the present embodiment is mounted on a vehicle and is caused to perform an opening and closing operation.

FIG. 5 is a diagram of results of measurement of sound pressure in a case where the door opening/closing device according to the present embodiment is mounted on a vehicle and is caused to perform an opening and closing operation. In FIG. 5, the abscissa indicates the PWM frequency (kHz) in the PWM control, whereas the ordinate indicates the sound pressure (dB-A) in a case where the door opening/closing device 1 performs an opening and closing operation. The sound pressure (dB-A) is obtained by eliminating high frequencies outside the human audible range. Specifically, the measurement was made by attaching a low-pass filter that filtered out a sound at a high frequency of equal to or higher than 15 kHz to a measuring instrument that measured the sound pressure. A sound level meter (model number: LA511) manufactured by Ono Sokki Co., Ltd. was used as the measuring instrument of the sound pressure. A low-pass filter (model number: NS-5150) manufactured by Ono Sokki Co., Ltd. was used as the low-pass filter.

The measurement illustrated in FIG. 5 was made by actually attaching the door opening/closing device 1 to the vehicle 100 and opening and closing the hatchback door 101. The measurement was made in the opening operation and the closing operation when the motor case 201 was an aluminum case and when the motor case 201 was a resin case. As illustrated in FIG. 5, when the aluminum case was used, the resonance point having the highest sound pressure was at 15 kHz. In the case of using an aluminum case as the motor case 201, the PWM frequency is set so as to deviate from 15 kHz. Thus, it is possible to provide the door opening/closing device 1 that generates a small sound in the opening and closing operation. When the resin case was used, the resonance point was at 14 kHz. In the case of using a resin case as the motor case 201, the PWM frequency is set so as to deviate from 14 kHz. Thus, it is possible to provide the door opening/closing device 1 that generates a small sound in the opening and closing operation.

As described above, the door opening/closing device 1 according to the present embodiment performs the PWM control on the motor 2 at the PWM frequency set so as to deviate from the resonance point of the installation body on which the motor 2 is installed. As a result, the door opening/closing device 1 generates a small sound in the opening and closing operation.

The set PWM frequency is preferably higher than the frequency at the resonance point and more preferably equal to or higher than 15 kHz. This is because the human hearing is less sensitive to a higher frequency, and a frequency of equal to or higher than 15 kHz exceeds the audible range of some people.

In a case where the PWM frequency is set high, the amount of heat generation of the ECU C1 may possibly increase. In this case, measures for radiating heat from the ECU C1 are preferably taken in hardware, such as a measure of providing the door opening/closing device 1 with excellent heat radiation performance.

The measurement illustrated in FIG. 5 was performed by changing the material of the motor case 201. The resonance, however, may possibly occur not only in the motor case 201 but also in the installation body including the brackets B1 and B2 connected to the motor case 201 and the vehicle 100. As a result, the resonance point may possibly vary depending on the vehicle to which the door opening/closing device 1 is attached. Therefore, it is preferable that the door opening/closing device 1 be actually attached to each vehicle to measure the sound pressure in the opening and closing operation of the door. Subsequently, the resonance point is detected from the measurement result, the PWM frequency is set so as to deviate from the resonance point, and the set PWM frequency is stored in a storage unit of the control unit, more preferably in a rewritable storage unit. Thus, it is possible to provide the door opening/closing device that generates a small sound in the opening and closing operation.

Because vehicles are each composed of substantially the same parts for each vehicle model, setting of the optimum PWM frequency for each vehicle model is effective.

The door opening/closing device 1 according to the present embodiment can be used for opening and closing of a sliding door provided to the side of the vehicle 100 besides of the hatchback door 101.

Figure 6:
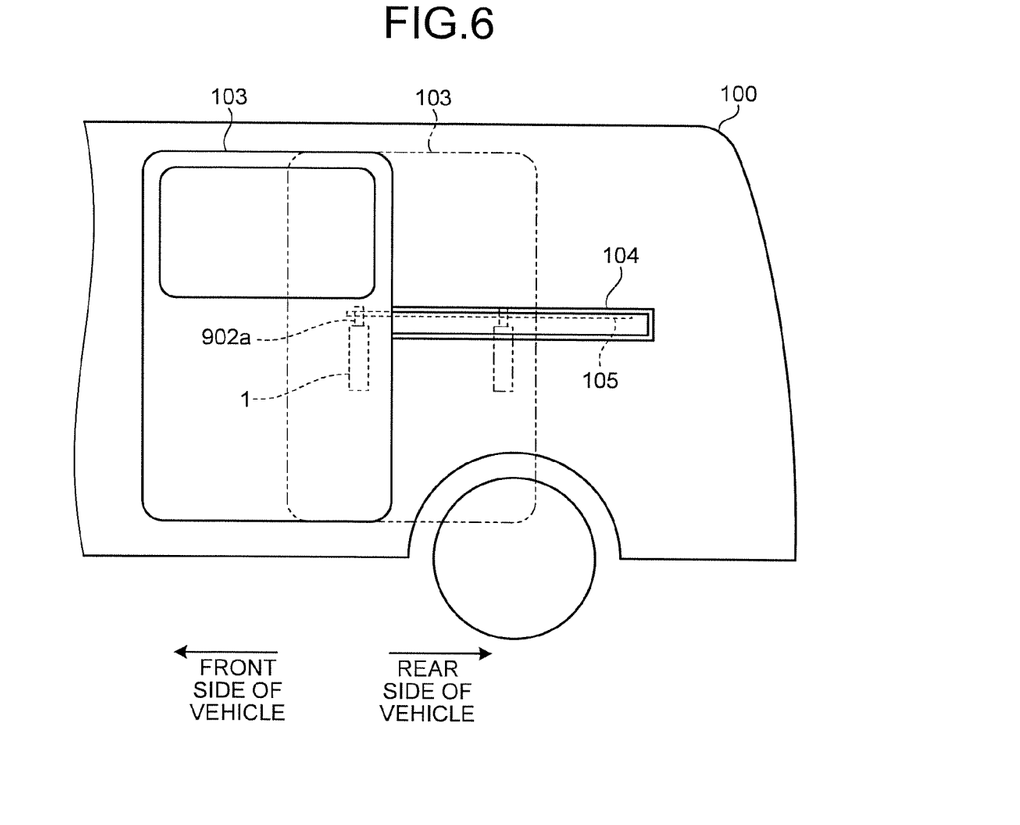
FIG. 6 is a schematic of an installation example where the door opening/closing device according to the present embodiment is used to open and close a sliding door.
Figure 7:
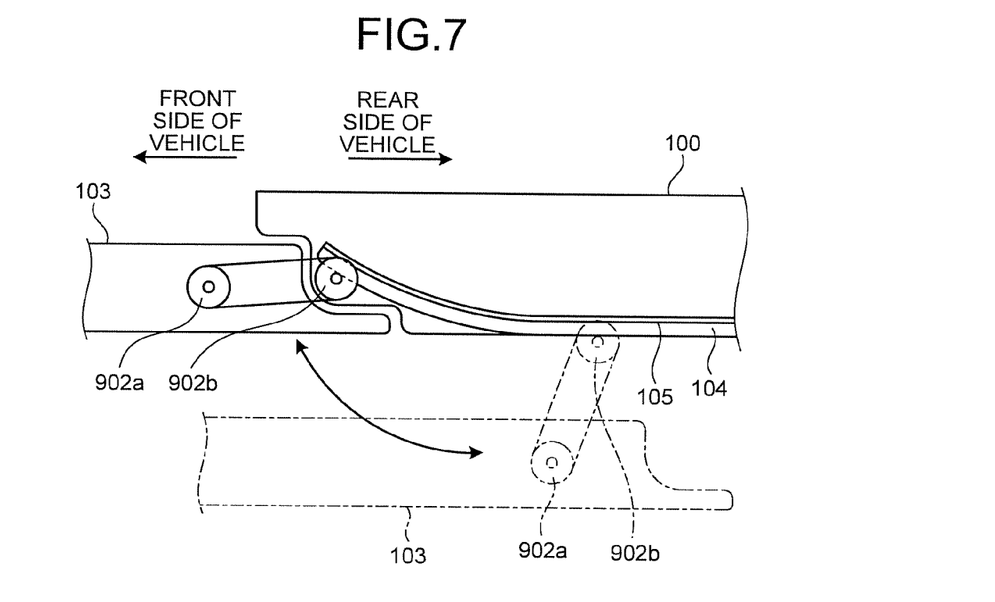
FIG. 7 is a schematic viewed from above the vehicle illustrated in FIG. 6.

FIG. 6 is a schematic of an installation example where the door opening/closing device according to the present embodiment is used to open and close a sliding door. FIG. 7 is a schematic viewed from above the vehicle illustrated in FIG. 6. A sliding door 103 moves in the directions forward and rearward the vehicle along a guide rail 104 provided to the vehicle 100. In a case where the door opening/closing device 1 according to the present embodiment is used to open and close the sliding door 103, the door opening/closing device 1 is arranged inside the sliding door 103 as illustrated in FIG. 6, for example. The door opening/closing device 1 is arranged with the rotation axis of the output shaft 3 extending along the vertical direction of the vehicle. The output shaft 3 is provided with a first rotating drum 902a. The first rotating drum 902a is attached so as to rotate about the rotation axis of the output shaft 3. To open and close the sliding door 103 using the door opening/closing device 1, a cable 105 provided along the guide rail 104 is wound while being fed by the first rotating drum 902a and a second rotating drum 902b. Thus, the sliding door 103 moves along the guide rail 104.

Also in a case where the door opening/closing device 1 according to the present embodiment is provided to the sliding door 103, the PWM frequency is set so as to deviate from the resonance point of the installation body on which the motor 2 is installed. Thus, it is possible to provide the door opening/closing device that generates a small sound in the opening and closing operation.

As described above, the door opening/closing device 1 according to the present embodiment generates a small sound in the opening and closing operation.

The explanation has been made of the PWM control performed on the motor 2 by the control unit C in a case where the door opening/closing device 1 assists manual opening and closing of the door. The present invention is also applicable to a case where the door opening/closing device 1 opens and closes the door without any manual opening or closing operation. In this case, the user transmits an instruction signal to instruct opening or closing of the door with a remote-control key, for example. The control unit C receives the instruction signal, and the operation determining unit C21 determines at how much rotation speed the motor 2 is to be rotated and whether the motor 2 is rotated in the opening direction or the closing direction.

The first planetary gear mechanism 5, the second planetary gear mechanism 7, and the third planetary gear mechanism 8 do not necessarily have the configuration described above and may have another configuration. The deceleration mechanism connected to the motor 2 is not limited to a planetary gear mechanism and may be a cycloidal deceleration mechanism or a deceleration mechanism using a spur gear, for example. The deceleration mechanism is not limited to a three-stage mechanism and may be a zero- to two-stage mechanism or a multi-stage mechanism of four stages or more.

The door opening/closing device 1 may include a clutch mechanism. While the clutch mechanism is an electromagnetic clutch, for example, it may have another configuration. The door opening/closing device 1 may include a brake mechanism. While the brake mechanism is a spring brake, for example, it may have another configuration.

The output shaft 3 may be provided with a universal joint, an axis-direction converting mechanism, and a motion converting mechanism, for example. The universal joint can convert rotation of the output shaft 3 into rotation about a rotation axis in a direction different from that of the rotation axis of the output shaft 3. The axis-direction converting mechanism rotates about a rotation axis orthogonal to that of the output shaft 3. The motion converting mechanism converts a rotational motion output from the output shaft 3 into a linear motion along an axial center direction.

The embodiment above is not intended to limit the present invention. Aspects obtained by appropriately combining the components described above are included in the present invention. Other advantageous effects and modifications are easily conceivable by those skilled in the art. Thus, a broader range of aspects according to the present invention are not limited to the embodiment above, and various changes can be made.

INDUSTRIAL APPLICABILITY

As described above, the door opening/closing device and the door opening/closing method according to the present invention are effectively used to make a sound generated in an opening and closing operation of a door of a vehicle smaller.

REFERENCE SIGNS LIST 1 door opening/closing device
100 vehicle
101 hatchback door
102 hinge
103 sliding door
104 guide rail
105 cable
2 motor
201 motor case
3 output shaft
4 transmission mechanism
5 first planetary gear mechanism
501, 701, 801 gear case
6 sensor mechanism
601, 602 sensor case
603, 802, 901 bolt
7 second planetary gear mechanism
8 third planetary gear mechanism
9 arm
902a first rotating drum
902b second rotating drum
A shaft rod
B1, B2, B3 bracket
C control unit
C1 ECU
C2 MPU
C21 operation determining unit
C22 rotation rate calculating unit
C23 rotation direction switching unit
C3 control circuit
S1 pulse sensor
S2 rotation sensor
S3 temperature sensor

The invention claimed is:
1. A door opening/closing device comprising:
a motor; and
a control unit that is configured to control a rotation rate of the motor by pulse-width modulation (PWM) control, the door opening/closing device opening and closing a door of a vehicle with power of the motor; and
a deceleration mechanism arranged in an axis direction of a rotating shaft of the motor and configured to decelerate and output power received from the motor,
wherein the control unit includes:
an operation determining unit configured to determine a rotation speed of the motor and a rotation direction of the motor, based on electrical signals output from:
a pulse sensor configured to detect a driving condition of the door opening/closing device;
a rotation sensor configured to detect a position of the door, a movement speed of the door and a movement direction of the door; and
a temperature sensor configured to detect ambient temperature outside the vehicle;
a rotation rate calculating unit configured to calculate a rotation rate of the motor required to achieve a movement speed of the door and a duty ratio in the PWM control to achieve the rotation rate, based on an electrical signal output from the pulse sensor and on a determination result output from the operation determining unit;
a rotation direction switching unit configured to output a relay circuit control signal to rotate the motor in a rotation direction based on the determination result output from the operation determining unit; and
a control circuit configured to supply a pulse current flowing in a direction at a duty ratio and a frequency to the motor, based on a received PWM control signal and a received relay circuit control signal,
wherein the control unit is configured to perform the PWM control on the motor at a PWM frequency set so as to deviate from a mechanical resonance point of an installation body on which the motor is installed, the PWM frequency is set higher than a frequency of the resonance point, the deceleration mechanism is a planetary gear mechanism, and the PWM frequency is set to be equal to or higher than 15 kHz.

2. The door opening/closing device according to claim 1, wherein the installation body comprises:
a housing unit that is configured to house the motor;
a fixing unit that is configured to fix the door opening/closing device to the vehicle; and
the vehicle.

3. A door opening/closing method for controlling a rotation rate of a motor by pulse-width modulation (PWM) control and opening and closing a door of a vehicle with power of the motor, the door opening/closing method comprising:
determining a rotation speed of the motor and a rotation direction of the motor, based on electrical signals output from:
a pulse sensor configured to detect a driving condition of the door opening/closing device;
a rotation sensor configured to detect a position of the door, a movement speed of the door and a movement direction of the door: and
a temperature sensor configured to detect ambient temperature outside the vehicle;
calculating a rotation rate of the motor required to achieve a movement speed of the door and a duty ratio in the PWM control to achieve the rotation rate, based on an electrical signal output from the pulse sensor and on a determination result of the determining; and
outputting a relay circuit control signal to rotate the motor in a rotation direction based on the determination result of the determining;
supplying a pulse current flowing in a direction at a duty ratio and a frequency to the motor, based on a received PWM control signal and a received relay circuit control signal: and
decelerating and outputting power received from the motor, by a deceleration mechanism arranged in an axis direction of a rotating shaft of the motor,
wherein the PWM control is performed on the motor at a PWM frequency that is set higher than a frequency of a resonance point of an installation body on which the motor is installed, the PWM frequency being equal to or higher than 15 kHz, and wherein the deceleration mechanism is a planetary gear mechanism.

4. The door opening/closing method according to claim 3, wherein the installation body comprises:
   a housing unit that is configured to house the motor;
   a fixing unit that is configured to fix a door opening/closing device to the vehicle; and
   the vehicle.

\* \* \* \* \*